US008618765B2

United States Patent
Sano et al.

(10) Patent No.: US 8,618,765 B2
(45) Date of Patent: Dec. 31, 2013

(54) APPARATUS AND METHOD OF CONTROLLING AN ELECTRIC OIL PUMP DRIVING MOTOR

(75) Inventors: Yukihiro Sano, Fuji (JP); Yuukou Nojiri, Hitachi (JP); Ippei Suzuki, Hitachinaka (JP); Jyunichi Noda, Naka (JP)

(73) Assignee: Jatco Ltd, Fuji-shi (JP)

( * ) Notice: Subject to any disclaimer, the term of this patent is extended or adjusted under 35 U.S.C. 154(b) by 290 days.

(21) Appl. No.: 13/230,045

(22) Filed: Sep. 12, 2011

(65) Prior Publication Data

US 2012/0062164 A1 Mar. 15, 2012

(30) Foreign Application Priority Data

Sep. 14, 2010 (JP) ................................. 2010-205147

(51) Int. Cl.
 *H02P 6/08* (2006.01)
 *H02P 25/02* (2006.01)
(52) U.S. Cl.
 CPC ..................................... *H02P 25/023* (2013.01)
 USPC ............ 318/721; 318/700; 318/720; 318/802
(58) Field of Classification Search
 CPC ..................................................... H02P 25/023
 USPC .................................. 318/721, 720, 700, 802
 See application file for complete search history.

(56) References Cited

U.S. PATENT DOCUMENTS

| 6,692,402 | B2 | 2/2004 | Nakamori et al. |
| 7,042,227 | B2 * | 5/2006 | Mir et al. ...................... 324/503 |
| 2002/0091034 | A1 | 7/2002 | Nakamori et al. |
| 2009/0237015 | A1 | 9/2009 | Hashimoto et al. |
| 2010/0164429 | A1 | 7/2010 | Ide |

FOREIGN PATENT DOCUMENTS

| EP | 1 705 378 A2 | 9/2006 |
| JP | 2002-206630 A | 7/2002 |
| WO | WO 2007/096719 A1 | 8/2007 |

* cited by examiner

*Primary Examiner* — Bentsu Ro
*Assistant Examiner* — David Luo
(74) *Attorney, Agent, or Firm* — Foley & Lardner LLP

(57) ABSTRACT

In an apparatus for controlling a sensorless electric motor that drives an electric oil pump, in a case where a rotational speed of the motor deviates from a first range defined between a first upper limit value and a first lower limit value, a rotational speed limiting section generates a current command signal acting for controlling the rotational speed of the motor to suppress deviation of the rotational speed of the motor from the first range, and in a case where deviation of the rotational speed of the motor from the first range is continued for a predetermined time or more, the rotational speed limiting section sets a second range defined between a second upper limit value and a second lower limit value which are respectively displaced from the first upper limit value and the first lower limit value in a direction in which the deviation is continued.

6 Claims, 5 Drawing Sheets

APPARATUS AND METHOD OF CONTROLLING AN ELECTRIC OIL PUMP DRIVING MOTOR

BACKGROUND OF THE INVENTION

The present invention relates to an apparatus and method of controlling an electric oil pump, and particularly relates to an apparatus and method of controlling an electric oil pump driving motor suitable when using a brushless motor for driving the electric oil pump which is disposed in a circuit of the electric oil pump.

There has been proposed a hybrid vehicle that is driven by a gasoline engine and an electric motor in view of improvement in fuel economy of a vehicle and environmental issue. The hybrid vehicle performs so-called idling stop control in which the engine is allowed to stop when the vehicle is stopped. Upon conducting idling stop, an engine driven mechanical pump is stopped, and a motor driven electric pump is actuated to supply oil to parts of the vehicle and allow next smooth starting of the vehicle.

A working oil that is used in the motor driven electric oil pump as described above has a viscosity variable in accordance with a temperature change. Due to variation in viscosity, a flow rate of the working oil is changed, and a hydraulic pressure is also changed. Therefore, Japanese Patent Application Unexamined Publication No. 2002-206630 discloses a drive control apparatus for an oil pump in which a working voltage for an oil pump driving motor is changed in order to vary a flow rate of the working oil.

SUMMARY OF THE INVENTION

Hydraulic mechanisms of the vehicle to which oil is supplied by an oil pump include one type in which hydraulic pressure is steadily supplied, and another type in which hydraulic pressure supply is switched between ON and OFF. For instance, in the case of a hybrid vehicle, there is provided a clutch mechanism for allowing changeover between a mechanical rotation force generated by the engine and an electrical rotation force generated by the electric motor or coupling the mechanical rotation force and the electrical rotation force together. Such an ON-OFF hydraulic mechanism causes a large variation in hydraulic pressure to be supplied every time the changeover or the coupling is conducted.

Specifically, in a case where a valve is opened to communicate a hydraulic passage with the clutch mechanism in order to drive the clutch mechanism, the oil pump is in a substantially non-load condition until the oil is charged into the hydraulic passage. Conversely, when the charge of the oil is completed, the oil pump supplies a clutch pressure and thereby is brought into a heavy load condition. Thus, there occurs rapid variation in load of the oil pump in a short time.

This means that, when the motor is driven with a constant torque, the rotational speed of the motor is rapidly increased under a non-load condition and the rotational speed of the motor is rapidly dropped under a heavy load condition. Particularly, an oil pump driving motor of a sensorless control type which has no magnetic pole position sensor or rotation sensor, suffers from such a problem that the motor is diverted from a controllable range and brought into step-out in which the motor is uncontrollable.

This problem cannot be solved by the apparatus as described in the above conventional art in which a working voltage for an oil pump driving motor is changed in a proportional relation to an oil temperature.

It is an object of the present invention to provide an apparatus and method of controlling an electric oil pump which is capable of stably controlling the electric oil pump at an optimal value without causing step out even in a case where a brushless motor used in the electric oil pump is under sensorless control.

In one aspect of the present invention, there is provided an apparatus for controlling an electric oil pump driving motor in an oil pump system, the oil pump system comprising a mechanical oil pump that is driven by an engine to supply a hydraulic pressure, an electric oil pump that is driven by a sensorless electric motor to supply a hydraulic pressure, an oil supply changeover mechanism that selects oil supply from the mechanical oil pump when the engine is in a driving condition, and oil supply from the electric oil pump when the engine is in a stopped condition, and an automatic transmission control unit that generates a start command for the electric motor and oil supply information about the oil supply in the oil pump system when the engine is in the stopped condition, the apparatus comprising:

a control command generating section that generates a sum signal indicating a sum of a first current command signal to determine torque for the electric motor and a second current command signal determined by a deviation in rotational speed of the electric motor, on the basis of the oil supply information from the automatic transmission control unit;

a current control section that generates a third current command signal determined from a difference between the sum signal outputted from the control command generating section and a load current flowing in the electric motor;

an electric motor control section that receives the third current command signal outputted from the current control section and executes vector control; and an electric power conversion section that is controlled by the electric motor control section so as to control an alternating current to be applied to the electric motor;

wherein the control command generating section comprises a rotational speed limiting section to obtain the second current command signal, the rotational speed limiting section has a first upper limit value and a first lower limit value of the rotational speed of the electric motor, in a case where the rotational speed of the electric motor deviates from a first range defined between the first upper limit value and the first lower limit value, the rotational speed limiting section generates the second current command signal acting for controlling the rotational speed of the electric motor to suppress deviation of the rotational speed of the electric motor from the first range, and in a case where deviation of the rotational speed of the electric motor from the first range is continued for a predetermined time or more, the rotational speed limiting section sets a second range defined between a second upper limit value and a second lower limit value of the rotational speed of the electric motor which are respectively displaced from the first upper limit value and the first lower limit value in a direction in which the deviation of the rotational speed of the electric motor from the first range is continued.

In another aspect of the present invention, there is provided a method of controlling an electric oil pump driving motor in an oil pump system, the oil pump system comprising a mechanical oil pump that is driven by an engine to supply a hydraulic pressure, an electric oil pump that is driven by a sensorless electric motor to supply a hydraulic pressure, and an oil supply changeover mechanism that selects oil supply from the mechanical oil pump when the engine is in a driving condition, and oil supply from the electric oil pump when the engine is in a stopped condition, the method comprising:

maintaining a rotational speed of the electric motor in a first range defined between a first upper limit value and a first lower limit value; and in a case where the rotational speed of the electric motor deviates from the first range, controlling the rotational speed of the electric motor so as to suppress deviation of the rotational speed of the electric motor from the first range; and in a case where the deviation of the rotational speed of the electric motor from the first range is continued for a predetermined time or more, setting a second range defined between a second upper limit value and a second lower limit value of the rotational speed of the electric motor which are respectively displaced from the first upper limit value and the first lower limit value in a direction in which the deviation of the rotational speed of the electric motor from the first range is continued.

The apparatus and method of controlling an electric oil pump driving motor according to the present invention can restrict rapid variation in rotational speed of the motor even in a case where variation in load of the electric oil pump occurs when the motor is driven under torque control.

DETAILED DESCRIPTION OF THE INVENTION

An apparatus and method of controlling an electric oil pump driving motor according to an embodiment of the present invention will be explained by referring to the accompanying drawings.

Figure 1:
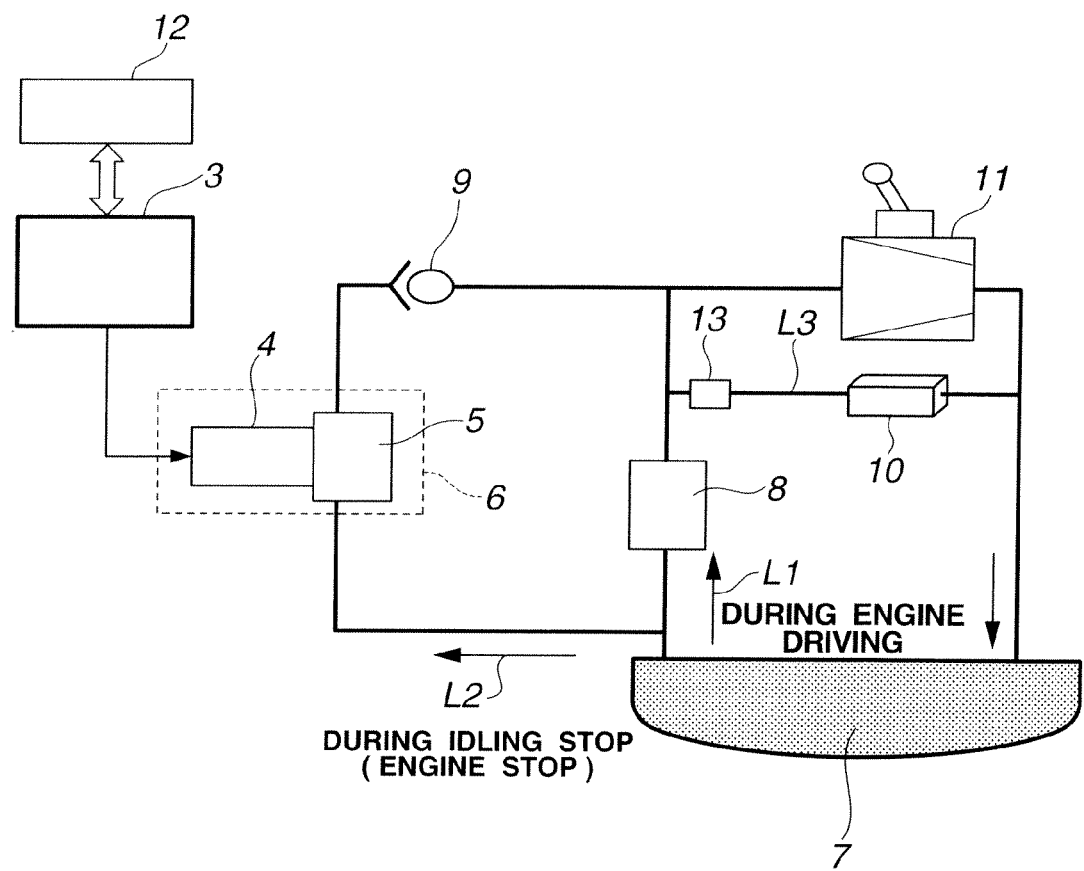
FIG. 1 is a block diagram showing a general construction of an electric oil pump system to which an apparatus for controlling an electric oil pump driving motor according to an embodiment of the present invention is applicable.

FIG. 1 is a block diagram showing a general construction of an electric oil pump system for an automatic transmission of a vehicle (hereinafter referred to merely as an AT oil pump system) to which an apparatus for controlling an electric oil pump driving motor according to the embodiment of the present invention, is applicable.

As shown in FIG. 1, the AT oil pump system includes mechanical oil pump 8 that is driven by an engine so as to supply a pressurized oil, and electric oil pump 5 that is controlled by the apparatus according to the embodiment of the present invention. The AT oil pump system further includes a hydraulic system that supplies an oil accumulated in oil pan 7 to clutch 10, automatic transmission mechanism 11, etc. via oil passages L1, L2 and returns the oil to oil pan 7. Valve 13 is disposed in an oil passage between mechanical oil pump 8 and clutch 10. Valve 13 is operative to open and close oil passage L3 between valve 13 and clutch 10. Valve 13 is operative to prevent the oil from being supplied to clutch 10 in a case where it is not necessary to actuate clutch 10.

In a case where the AT oil pump system is used in a vehicle capable of executing idling stop control, the oil is supplied to automatic transmission mechanism 11 and the like through oil passage L1 by mechanical oil pump 8 during driving of the engine, and the oil is supplied to automatic transmission mechanism 11 and the like through oil passage L2 by electric oil pump 5 during execution of the idling stop.

Changeover valve mechanism 9 is disposed in an oil passage between electric oil pump 5 and automatic transmission mechanism 11. In this embodiment, changeover valve mechanism 9 is a check valve. Changeover valve mechanism 9 is hydraulically set such that the oil supplied by electric oil pump 5 is supplied to clutch 10, automatic transmission mechanism 11, etc. under a condition that the hydraulic pressure of the oil supplied by electric oil pump 5 is larger than the hydraulic pressure of the oil supplied by mechanical oil pump 8. Ordinarily, the hydraulic pressure of the oil supplied by mechanical oil pump 8 driven by the engine is set higher than the hydraulic pressure of the oil supplied by electric oil pump 5. Accordingly, oil supply is carried out by mechanical oil pump 8 during driving of the engine, and is carried out by electric oil pump 5 during the idling stop in which the engine is stopped. Thus, changeover between the oil supply carried out by mechanical oil pump 8 and the oil supply carried out by electric oil pump 5 is performed.

The AT oil pump system is constructed as described above, and control of electric oil pump 5 in the AT oil pump system will be explained hereinafter.

In order to control electric oil pump 5, there is provided electric oil pump assembly 6 including electric oil pump 5 and brushless motor 4 that drives electric oil pump 5 and is of a sensorless type. Further, there are provided AT control unit 12 that controls an operation of electric oil pump assembly 6, and brushless motor control unit 3 that controls drive of electric oil pump assembly 6 on the basis of a control command signal from AT control unit 12.

With this construction, electric oil pump 5 is driven by brushless motor 4, and brushless motor 4 is controlled by brushless motor control unit 3. The control of brushless motor 4 by brushless motor control unit 3 is executed on the basis of a command from AT control unit 12. Brushless motor control unit 3 appropriately operates electric oil pump assembly 6 to supply the pressurized oil to clutch 10 and automatic transmission mechanism 11 when the engine is stopped or a necessary working oil pressure cannot be ensured by mechanical oil pump 8.

Further, AT control unit 12 receives various signals including a signal from a rotational speed sensor that detects an input rotational speed of automatic transmission mechanism 11, and a signal from a shift sensor detecting a shift range of a shift lever through which the vehicle driver operates automatic transmission mechanism 11. AT control unit 12 transmits a control command for operating electric oil pump assembly 6 to brushless motor control unit 3 on the basis of the signals.

In the AT oil pump system shown in FIG. 1 and constructed as described above, when idling stop of the vehicle is executed, the rotational speed of the engine is decreased, and the rotational speed of mechanical oil pump 8 becomes lower so that a hydraulic pressure in oil passage L1 connected to mechanical oil pump 8 is reduced.

On the other hand, simultaneously with execution of the idling stop, a command to actuate brushless motor 4 is transmitted from AT control unit 12 to brushless motor control unit 3. In response to the command, brushless motor 4 is actuated to rotate electric oil pump 5 and gradually increase a hydraulic pressure in oil passage L2 connected to electric oil pump 5.

When the hydraulic pressure in oil passage L1 is thus reduced and the hydraulic pressure in oil passage L2 is thus increased against the resistance of changeover valve mechanism 9 and exceeds a certain threshold value, the oil in oil pan 7 is circulated through a path extending from oil pan 7 to oil pan 7 via electric oil pump 5, changeover valve mechanism 9, automatic transmission mechanism 11 and clutch 10.

In the following, there is explained an operation of the above-described AT oil pump system when clutch 10 is operated to be engaged and disengaged under a condition that electric oil pump 5 is driven by brushless motor 4.

Figure 2:
FIG. 2 is a diagram showing variation in hydraulic pressure when a clutch of the electric oil pump system is actuated.

FIG. 2 shows a characteristic of variation in value of hydraulic pressure P in the oil passage on the side of an outlet port of changeover valve mechanism 9 (i.e., on the side of automatic transmission mechanism 11) when clutch 10 is actuated. In FIG. 2, a horizontal axis indicates time t, and a vertical axis indicates the hydraulic pressure P. The hydraulic pressure P is varied depending on the path of the oil and whether or not clutch 10 is actuated.

First, when valve 13 is in a close position thereof (before time t1 as shown in FIG. 2), the hydraulic pressure P in the oil passage on the side of an outlet port of changeover valve mechanism 9 which is given by electric oil pump 5 is stably held at value P1. In this condition, there is no oil in oil passage L3 extending from valve 13 to clutch 10.

When valve 13 is in an open position thereof (at time t1), the oil is flowed into oil passage L3 without receiving any resistance, so that the hydraulic pressure P is rapidly dropped from usual pressure value P1 to lower pressure value P2. After that, when the oil fulfills oil passage L3 and reaches clutch 10 (at time t2), the hydraulic pressure is rapidly increased until higher pressure value P3 at which clutch 10 starts the operation thereof (at time t3). Thus, there occurs rapid variation in value of the hydraulic pressure P which proceeds in this order, i.e., usual pressure value P1, lower pressure value P2 and higher pressure value P3 as shown in FIG. 2.

Figure 3:
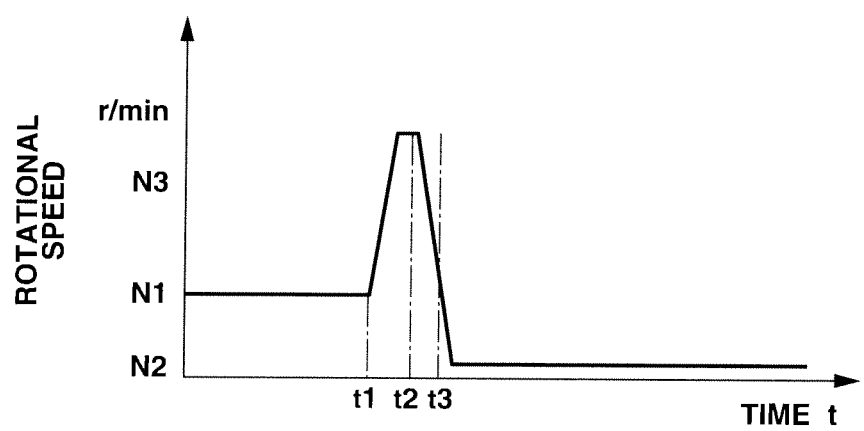
FIG. 3 is a diagram showing variation in rotational speed of the motor which occurs corresponding to the variation in hydraulic pressure as shown in FIG. 2.

When this operation of opening valve 13 to supply the oil to clutch 10 is carried out during idling stop, there occurs variation in rotational speed N of brushless motor 4 that drives electric oil pump 5 as shown in FIG. 3.

Load torque of brushless motor 4 is varied in proportion to the hydraulic pressure P. As shown in FIG. 3, when valve 13 is in the close position (before time t1), brushless motor 4 is stably operated at rotational speed value N1 that corresponds to hydraulic pressure value P1.

After time t1 at which valve 13 is opened, brushless motor 4 undergoes a rapid change in load torque. In a case where motor torque constant control for brushless motor 4 is executed, the rotational speed N is varied in synchronization with the change in load torque as shown in FIG. 3. Times t1, t2, t3 as shown in FIG. 3 are identical with those as shown in FIG. 2, respectively. The variation in the rotational speed N occurs later than the load torque due to influence of inertia of brushless motor 4 and electric oil pump 5.

At time t1 at which the hydraulic pressure P is held at value P1 as shown in FIG. 2, the rotational speed N is stably held at value N1. During the time period from time t1 to time t2, brushless motor 4 is held in a non-load drive condition due to the drop of the hydraulic pressure. In a case where the motor torque constant control is executed, input torque of brushless motor 4 is controlled at constant, but load torque thereof is low, so that the motor input becomes excessively large to thereby cause a rapid increase in the rotational speed N. After time t2, the hydraulic pressure is rapidly recovered, and the load torque is increased, so that the motor output becomes excessively large to thereby cause a rapid reduction in the rotational speed N.

In this embodiment in which the motor is brushless motor 4, it is not desirable that brushless motor 4 is operated under such an adverse environmental condition as the rapid variation in rotational speed of brushless motor 4 in view of possibility of occurrence of step-out. For this reason, a study to moderate variation in rotational speed of brushless motor 4 will be discussed hereinafter.

Rotational speed Nm of brushless motor 4 is expressed by the following formula (1). The hydraulic pressure of electric oil pump 5 is varied due to changeover between the oil passages. Therefore, the load torque of brushless motor 4 which varies in proportion to the hydraulic pressure is rapidly changed. At this time, as understood from the following formula (1), if motor output torque Tm is controlled at constant, the rotational speed Nm of brushless motor 4 is rapidly varied.

$$Nm = 1/J \times \int (Tm - TL) dt \quad (1)$$

wherein J denotes total inertia of pump inertia and motor inertia,

Tm denotes motor output torque, and

TL denotes motor load torque.

It is understood from the formula (1) that in order to allow the motor to operate with moderate variation in rotational speed thereof, the output torque of the motor may be controlled so as to increase and decrease in accordance with the variation in rotational speed of the motor.

Next, brushless motor control unit 3 according to the embodiment which allows brushless motor 4 to operate with moderate variation in rotational speed thereof even in the condition of transition of the rotational speed, is explained in detail.

Figure 4:
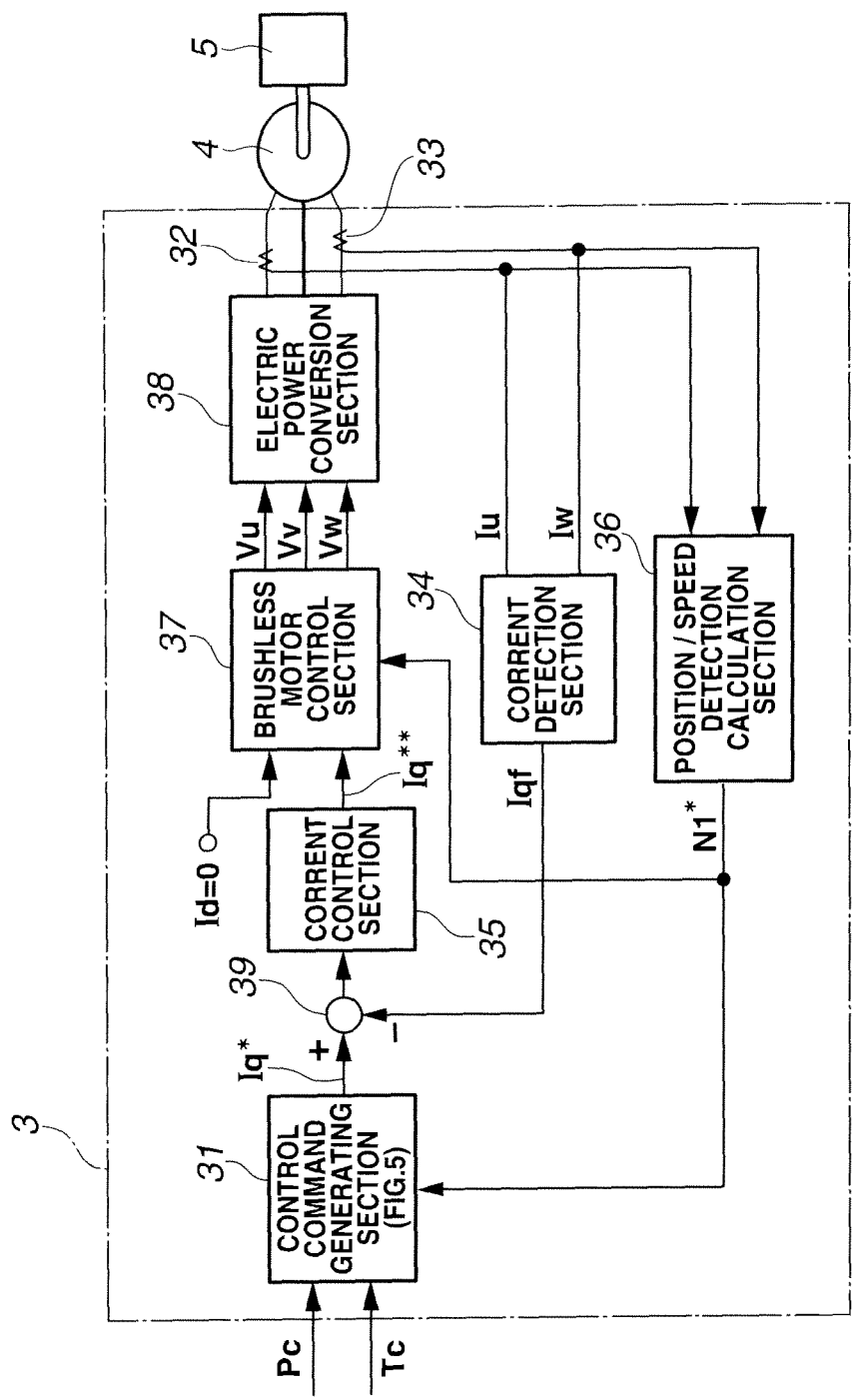
FIG. 4 is a block diagram showing a system of controlling the electric oil pump driving motor, according to the embodiment of the present invention.

FIG. 4 shows a block diagram of brushless motor control unit 3 in this embodiment.

Brushless motor control unit 3 serves to control brushless motor 4, and includes control command generating section 31 that generates q-axis current command value Iq* of brushless motor 4, current control section 35, brushless motor control section 37 that performs vector operation, and electric power conversion section 38 as main component thereof.

Upon performing this control, brushless motor control unit 3 performs read-in of q-axis current Iq as feedback value Iqf to current control section 35, and rotational speed N1* of brushless motor 4 for vector operation in brushless motor control section 37, which are processing amounts from the side of brushless motor 4. Reference numerals 32, 33 denote current detectors that detect optional Iu-phase and Iw-phase currents of a three-phase current, respectively. Reference numeral 34 denotes a current detection section that derives q-axis current Iqf as the feedback value. Reference numeral 36 denotes a position/speed detection operation section that calculates a pole position and motor rotational speed on the basis of brushless motor currents detected by current detectors 32, 33.

Further, upon performing this control, brushless motor control unit 3 receives hydraulic pressure command value Pc and oil temperature value Tc which are outputted from AT control unit 12 shown in FIG. 1.

Current control section 35 receives q-axis current Iq as feedback value Iqf from the side of brushless motor 4.

An operation of respective sections of brushless motor control unit 3 will be explained hereinafter in detail. Control command generating section 31 receives hydraulic pressure command value Pc and oil temperature value Tc as the control signals from AT control unit 12, converts the values Pc, Tc to a torque command value, and then generates q-axis current command value Iq* of brushless motor 4. The term "q-axis current of brushless motor 4" means a torque current of brushless motor 4. Accordingly, control command generating section 31 determines set value Iq* of the torque current.

Figure 5:
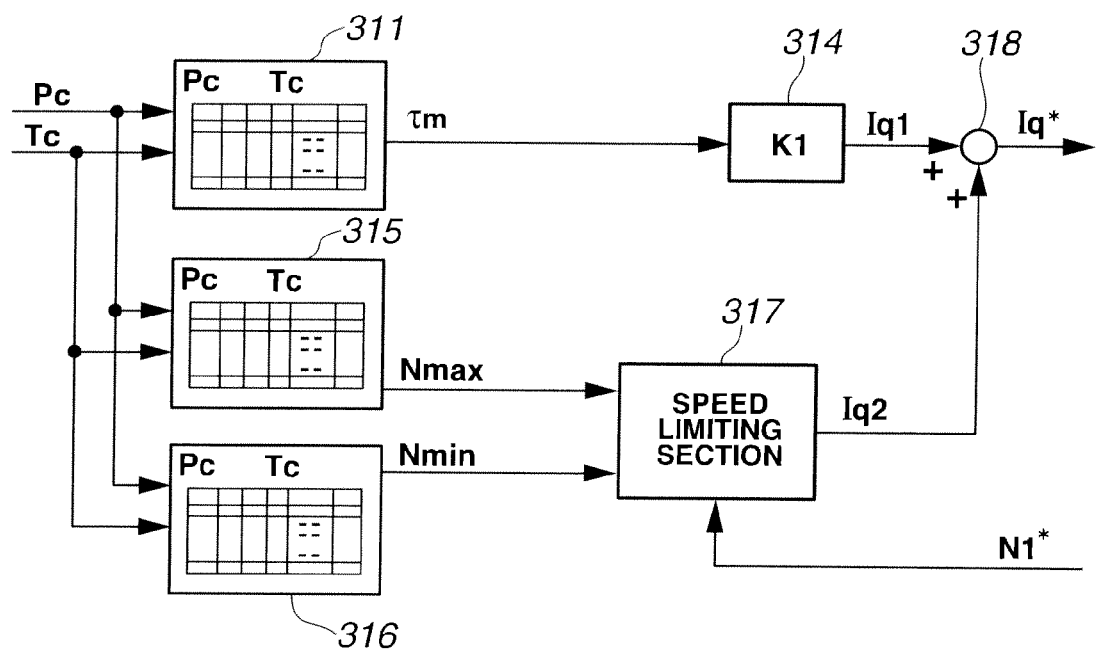
FIG. 5 is a diagram showing a construction of a control command generating section of the system as shown in FIG. 4.

Upon determining q-axis current command value Iq*, control command generating section 31 receives rotational speed N1* outputted from position/speed detection operation section 36. The apparatus and method according to this embodiment of the present invention uses a specific manner of determination of set value Iq* of the torque current. FIG. 5 shows a circuit diagram as explained later in detail.

Current control section 35 calculates a difference (Iq*−Iqf) between feedback value Iqf of q-axis current detected by current detection section 34 and command value Iq* through subtraction circuit 39, and obtains output signal Iq** by executing proportional integral control. Torque current Iqf as the feedback value may be derived by some methods. In this embodiment, the optional Iu-phase and Iw-phase currents of the three-phase current are detected by current detectors 32, 33, and the q-axis component is derived from these currents in current detection section 34.

Brushless motor control section 37 receives output signal Iq** of current control section 35, rotational speed N1*, and d-axis current command value Id of brushless motor 4, and performs vector operation to output U-phase alternating voltage Vu, V-phase alternating voltage Vv and W-phase alternating voltage Vw of three-phase alternating voltage. Electric power conversion section 38 receives the alternating voltages Vu, Vv, Vw outputted from brushless motor control section 37, converts the alternating voltages Vu, Vv, Vw to the three-phase alternating current, and outputs the three-phase alternating current to brushless motor 4. Position/speed detection operation section 36 calculates the pole position and the rotational speed of brushless motor 4 on the basis of the currents of brushless motor 4 detected by current detectors 32, 33.

In brushless motor control unit 3 having the construction as shown in FIG. 4, the deviation value obtained in current deviation operator (i.e, subtractor) 39 on the basis of current command value Iq* and current detection value Iqf are inputted to current control section 35, and second current command value Iq for brushless motor 4 is calculated in current control section 35 and outputted therefrom. Second current command value Iq, d-axis current command value Id, and rotational speed N1* are inputted to brushless motor control section 37 in which vector operation is performed. Output voltages Vu, Vv, Vw of brushless motor control section 37 are inputted to electric power conversion section 38 in which the output voltages Vu, Vv, Vw are converted to the three-phase alternating current. The three-phase alternating current is applied to brushless motor 4 to thereby rotate brushless motor 4 and drive electric oil pump 5.

According to brushless motor control unit 3 having the construction as shown in FIG. 4, brushless motor 4 is controlled by q-axis current command value Iq*, and this q-axis current command value Iq* is determined by control command generating section 31 as shown in detail in FIG. 5, on the basis of hydraulic pressure command value Pc and oil temperature Tc which are outputted from AT control unit 12 to brushless motor control unit 3.

Next, control command generating section 31 is explained in detail by referring to FIG. 5. FIG. 5 shows the construction of control command generating section 31.

Upon determining q-axis current command value Iq*, control command generating section 31 obtains a sum of output Iq1 of constant conversion section 314 that converts target torque τM to current command value Iq1, and output Iq2 of speed limiting section 317 through adder 318. That is, q-axis current command value Iq* is determined from the viewpoint of torque and speed.

Further, target values of torque and speed are determined on the basis of hydraulic pressure command value Pc and oil temperature Tc which are control signals from AT control unit 12 shown in FIG. 1.

Specifically, as shown in FIG. 5, control command generating section 31 includes torque command generating section 311 and constant conversion section 314 in order to determine current command value Iq1 in view of torque. Torque command generating section 311 receives hydraulic pressure command value Pc and oil pressure value Tc as the control signals from AT control unit 12, selects torque command value τm from a data table previously stored therein, and outputs torque command value τm. Constant conversion section 314 converts torque command value τm to current command value Iq1.

Further, control command generating section 31 includes upper limit section 315, lower limit section 316 and speed limiting section 317 in order to determine current command value correction amount Iq2 in view of speed. Upper limit section 315 receives hydraulic pressure command value Pc and oil temperature value Tc as the control signals from AT control unit 12, selects upper limit value of rotational speed $N_{max}$ (hereinafter referred to merely as upper limit speed value $N_{max}$) from a data table previously stored therein, and outputs upper limit speed value $N_{max}$. Lower limit section 316 receives hydraulic pressure command value Pc and oil temperature value Tc as the control signals from AT control unit 12, selects lower limit value of rotational speed $N_{min}$ (hereinafter referred to merely as lower limit speed value $N_{min}$) from a data table previously stored therein, and outputs lower limit speed value $N_{min}$. Speed limiting section 317 receives actual motor rotational speed N1* detected by position/speed detection operation section 36, determines current command value correction amount Iq2 such that the motor rotational speed has a value within the range defined between upper limit speed value $N_{max}$ and lower limit speed value $N_{min}$, and outputs current command value correction amount Iq2.

Next, speed limiting section 317 that determines current command value correction amount Iq2 is explained in more detail.

First, upper limit speed value $N_{max}$ and lower limit speed value $N_{min}$ which are selected and outputted by upper limit section 315 and lower limit section 316, respectively, are inputted to speed limiting section 317. A primary limit range is defined as the range between upper limit speed value $N_{max}$ and lower limit speed value $N_{min}$. Further, speed limiting section 317 has a plurality of secondary limit ranges each being smaller than the primary limit range.

The secondary limit ranges are ranges with the number of n into which the primary limit range is divided. The respective secondary limit ranges are defined between inner upper limit value $NU_i$ and inner lower limit value $NL_i$, wherein the letter "i" in $NU_i$ and $NL_i$ denotes a variable ranging from 0 to n. Accordingly, the secondary limit range may be defined by a plurality of combinations of upper limit value $NU_i$ and lower limit value $NL_i$.

Figure 6:
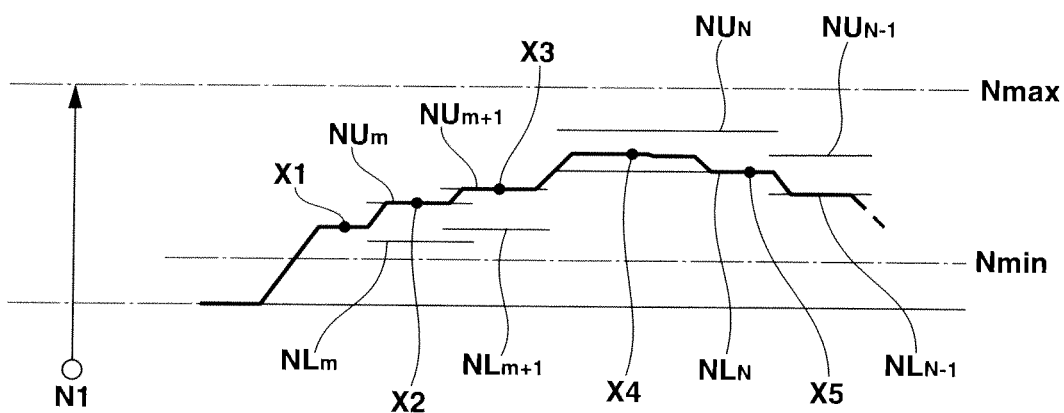
FIG. 6 is a diagram showing a relationship between rotational speed limit ranges of the electric oil pump driving motor.

FIG. 6 shows a relationship between the primary limit range and the secondary limit ranges. In FIG. 6, the primary limit range determined on the basis of hydraulic pressure command value Pc and oil temperature Tc outputted from AT control unit 12 is defined between upper limit speed value $N_{max}$ and lower limit speed value $N_{min}$ as indicated by dotted line. On the other hand, the secondary limit ranges smaller than the primary limit range, respectively, are defined between inner upper limit value $NU_i$ and inner lower limit value $NL_i$. As shown in FIG. 6, the secondary limit ranges are four limit ranges defined by combinations of inner upper limit value NUi (i.e., $NU_m$, $NU_{m+1}$, $NU_N$, $NU_{N-1}$) and inner lower limit value NLi (i.e., $NL_m$, $NL_{m+1}$, $NL_N$, $NL_{N-1}$).

The primary limit range and the respective secondary limit ranges are selectively used in accordance with conditions of electric oil pump 5, for instance, when electric oil pump 5 is started and when electric oil pump 5 is in a steady-state operating condition. When electric oil pump 5 is started, the primary limit range is used. At this time, the motor rotational speed has a value (N1 shown in FIG. 6) lower than lower limit speed value $N_{min}$ selected by lower limit section 316. Therefore, current command value correction amount Iq2 is determined as a positive value calculated from the difference between upper limit speed value $N_{max}$ and the value N1, so that the value of the rotational speed of brushless motor 4 is increased on the basis of the positive value of current command value correction amount Iq2. However, in a case where the value of the rotational speed becomes higher than lower limit speed value $N_{min}$ and falls in the primary limit range, the operation of limiting the motor rotational speed by using the primary limit range is not performed.

On the other hand, the respective secondary limit ranges smaller than the primary limit range are used in a steady-state operating condition of electric oil pump 5. However, even in the steady-state operating condition, when the motor rotational speed lies within the respective secondary limit ranges, the operation of limiting the motor rotational speed by using the respective secondary limit ranges is not performed. For instance, in a case where the motor rotational speed at the present time has value X1 that lies within the secondary limit range defined between inner upper limit value $NU_m$ and inner lower limit value $NL_m$ as shown in FIG. 6, inner upper limit value $NU_m$ and inner lower limit value $NL_m$ between which the secondary limit range is defined do not serve for calculating current command value correction amount Iq2.

When the rapid variation in rotational speed of brushless motor 4 occurs as shown in FIG. 3 and the motor rotational speed begins to deviate from the secondary limit range defined between inner upper limit value $NU_m$ and inner lower limit value $NL_m$, inner upper limit value $NU_m$ and inner lower limit value $NL_m$ can serve for calculating current command value correction amount Iq2. That is, when the value of the motor rotational speed is displaced from X1 to X2 and has reached inner upper limit value $NU_m$, inner upper limit value $NU_m$ and inner lower limit value $NL_m$ can serve for calculating current command value correction amount Iq2.

At this time, speed limiting section 317 detects that the actual motor rotational speed has reached inner upper limit value $NU_m$, calculates current command value correction amount Iq2 as a negative value from the difference between the actual motor rotational speed and inner lower limit value $NL_m$ and outputs current command value correction amount Iq2. Current command value Iq* is reduced on the basis of the negative value of current command value correction amount Iq2 outputted, so that the actual motor rotational speed is decreased to inner upper limit value $NU_m$ or less, thereby limiting an increase in the motor rotational speed.

That is, in this condition, since load torque of brushless motor 4 is rapidly reduced to thereby cause an increase in the motor rotational speed, the operation of limiting the motor rotational speed is performed such that the motor rotational speed is decreased by reducing the input torque to be applied to brushless motor 4 to thereby balance the input torque and the output torque of brushless motor 4 with each other.

However, in a case where there occurs the rapid and large variation in the motor rotational speed as shown in FIG. 3, balancing of the input torque and the output torque of brushless motor 4 cannot be immediately performed. As a result, the motor rotational speed still stays at inner upper limit value $NU_m$ and is not decreased from inner upper limit value $NU_m$.

In order to solve the above problem, in the apparatus and method according to the embodiment of the present invention, a time period during which the motor rotational speed is not decreased from and adhered to inner upper limit value $NU_m$ is monitored, and the secondary limit range at the present is shifted to the next secondary limit range defined between inner upper limit value $NU_{m+1}$ and inner lower limit value $NL_{m+1}$. Inner upper limit value $NU_{m+1}$ and inner lower limit value $NL_{m+1}$ are respectively larger than inner upper limit value $NU_m$ and inner lower limit value $NL_m$.

In the embodiment as shown in FIG. 6, the motor rotational speed is not changed to decrease even by shifting to the next secondary limit range defined by inner upper limit value $NU_{m+1}$ and inner lower limit value $NL_{m+1}$, and finally, the motor rotational speed is changed to stably decrease by shifting to the subsequent secondary limit range defined by inner upper limit value $NU_N$ and inner lower limit value $NL_N$ that are larger than inner upper limit value $NU_{m+1}$ and inner lower limit value $NL_{m+1}$.

In the example as shown in FIG. 3, when clutch 10 is supplied with the oil after the motor rotational speed is increased, the motor rotational speed is decreased. As shown in FIG. 6, at value X5 of the motor rotational speed, the motor rotational speed is changed to decrease. At this time, speed limiting section 317 detects that the actual motor rotational speed has reached not more than inner lower limit value $NL_N$ that defines the secondary limit range in cooperation with inner upper limit value $NU_N$ therebetween, calculates current command value correction amount Iq2 as a positive value from the difference between the actual motor rotational speed and inner upper limit value $NU_N$, and outputs current command value correction amount Iq2. Current command value Iq* is increased on the basis of the positive value of the current command value correction amount Iq2 outputted, so that the actual motor rotational speed is increased to inner lower limit value $NL_N$ or more, thereby limiting a decrease in the motor rotational speed.

That is, in this condition, since load torque of brushless motor 4 is rapidly increased to thereby cause a decrease in the motor rotational speed, the operation of limiting the motor rotational speed is performed such that the motor rotational speed is increased by increasing the input torque to be applied to brushless motor 4 to thereby balance the input torque and the output torque of brushless motor 4 with each other.

Further, the secondary limit range is shiftable to follow variation in the motor rotational speed until the motor rotational speed becomes stable. In this case, when an operation of shifting to the next secondary limit range is carried out, the shifting operation is performed after the time period in which the motor rotational speed stays at the inner lower limit value of the present secondary limit range is monitored, similarly to the above-described case where the operation of limiting the increase in motor rotational speed is performed.

Further, upon obtaining current command value correction amount Iq2 as an output, speed limiting section 317 executes proportional integral control to input deviation.

In thus constructed control command generating section 31, when motor rotational speed N1* is in the range defined between upper limit speed value $N_{max}$ and lower limit speed value $N_{min}$, value Iq1 is determined as q-axis current command value Iq*. When motor rotational speed N1* deviates from the range defined between upper limit speed value $N_{max}$ and lower limit speed value $N_{min}$, a sum of value Iq1 and current command value correction amount Ig2, i.e., (Iq1+ Iq2), which corresponds to an amount of the deviation is determined as q-axis current command value Iq*.

Figure 7:
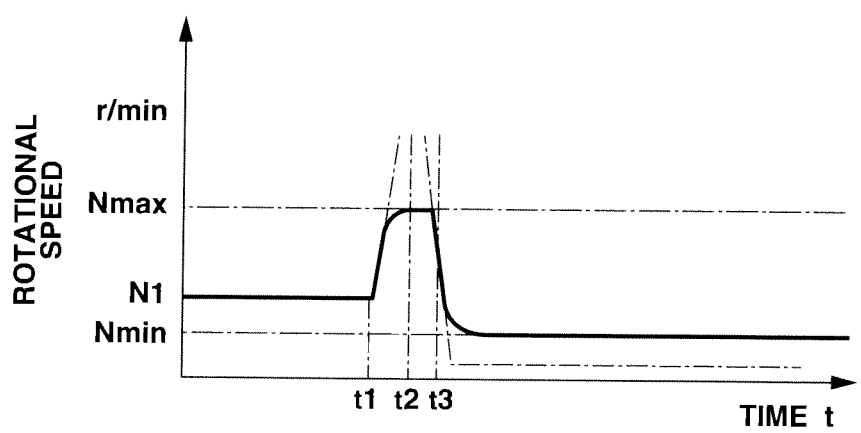
FIG. 7 is a diagram showing variation in rotational speed of the electric oil pump driving motor in the apparatus according to the embodiment of the present invention.

FIG. 7 shows variation in rotational speed of brushless motor 4 when the above control is executed. When the motor rotational speed tends to increase, q-axis current command value Iq* is controlled so as to decrease the input torque of brushless motor 4. When the motor rotational speed tends to decrease, q-axis current command value Iq* is controlled so as to increase the input torque of brushless motor 4. As a result, a variation range of the motor rotational speed can be reduced to a small range, thereby reducing danger of occurrence of step-out of a sensorless motor.

The apparatus and method according to the embodiment of the present invention can reduce variation in motor rotational speed due to variation in load torque by performing limiting of the motor rotational speed by an upper limit value and a lower limit value that define a small range.

By controlling the rotational speed of the brushless motor as explained above, output torque of the brushless motor can be increased and decreased in response to variation of the rotational speed of the brushless motor. Accordingly, in a case where constant torque control of the brushless motor is executed, it is possible to suppress step-out of the brushless motor due to rapid variation in load.

As explained above, even in a case where in a brushless motor system for driving an electric oil pump, hydraulic pressure is varied in accordance with changeover of oil passages or the like and load torque of a brushless motor is rapidly varied, the apparatus and method according to the embodiment of the present invention can suppress a rapid variation of the motor rotational speed and stably control the brushless motor without suffering from step-out.

Further, the apparatus and method according to the embodiment of the present invention can suppress occurrence of torque shock and abnormal sound due to a rapid change in rotational speed of the electric oil pump or the like, and occurrence of damage in the brushless motor and the electric oil pump.

This application is based on a prior Japanese Patent Application No. 2010-205147 filed on Sep. 14, 2010. The entire contents of the Japanese Patent Application No. 2010-205147 are hereby incorporated by reference.

Although the invention has been described above by reference to a certain embodiment of the invention, the invention is not limited to the embodiment as described above. Further variations of the embodiment as described above will occur to those skilled in the art in light of the above teachings. The scope of the invention is defined with reference to the following claims.

What is claimed is:

1. An apparatus for controlling an electric oil pump driving motor in an oil pump system, the oil pump system comprising a mechanical oil pump that is driven by an engine to supply a hydraulic pressure, an electric oil pump that is driven by a sensorless electric motor to supply a hydraulic pressure, an oil supply changeover mechanism that selects oil supply from the mechanical oil pump when the engine is in a driving condition, and oil supply from the electric oil pump when the engine is in a stopped condition, and an automatic transmission control unit that generates a start command for the electric motor and oil supply information about the oil supply in the oil pump system when the engine is in the stopped condition, the apparatus comprising:

a control command generating section that generates a sum signal indicating a sum of a first current command signal to determine torque for the electric motor and a second current command signal determined by a deviation in rotational speed of the electric motor, on the basis of the oil supply information from the automatic transmission control unit;

a current control section that generates a third current command signal determined from a difference between the sum signal outputted from the control command generating section and a load current flowing in the electric motor;

an electric motor control section that receives the third current command signal outputted from the current control section and executes vector control; and an electric power conversion section that is controlled by the electric motor control section so as to control an alternating current to be applied to the electric motor;

wherein the control command generating section comprises a rotational speed limiting section to obtain the second current command signal, the rotational speed limiting section has a first upper limit value and a first lower limit value of the rotational speed of the electric motor, in a case where the rotational speed of the electric motor deviates from a first range defined between the first upper limit value and the first lower limit value, the rotational speed limiting section generates the second current command signal acting for controlling the rotational speed of the electric motor to suppress deviation of the rotational speed of the electric motor from the first range, and in a case where deviation of the rotational speed of the electric motor from the first range is continued for a predetermined time or more, the rotational speed limiting section sets a second range defined between a second upper limit value and a second lower limit value of the rotational speed of the electric motor which are respectively displaced from the first upper limit value and the first lower limit value in a direction in which the deviation of the rotational speed of the electric motor from the first range is continued.

2. The apparatus as claimed in claim 1, wherein the control command generating section comprises a first signal generating section that sets an upper limit speed value of the rotational speed of the electric motor on the basis of the oil supply information from the automatic transmission control unit, and a second signal generating section that sets a lower limit speed value of the rotational speed of the electric motor on the basis of the oil supply information from the automatic transmission control unit, and the rotational speed limiting section limits the rotational speed of the electric motor within a primary limit range defined between the upper limit speed value set by the first signal generating section and the lower limit speed value set by the second signal generating section, and sets the first upper limit value and the first lower limit value within the primary limit range.

3. The apparatus as claimed in claim 2, wherein when the electric oil pump is started, the rotational speed limiting section determines the second current command signal by using the upper limit speed value set by the first signal generating section and the lower limit speed value set by the second signal generating section as set signals, and when the electric oil pump is in an operating condition, the rotational speed limiting section determines the second current command signal by using the first upper limit value and the first lower limit value as set signals.

4. A method of controlling an electric oil pump driving motor in an oil pump system, the oil pump system comprising a mechanical oil pump that is driven by an engine to supply a hydraulic pressure, an electric oil pump that is driven by a sensorless electric motor to supply a hydraulic pressure, and an oil supply changeover mechanism that selects oil supply from the mechanical oil pump when the engine is in a driving condition, and oil supply from the electric oil pump when the engine is in a stopped condition, the method comprising:

maintaining a rotational speed of the electric motor in a first range defined between a first upper limit value and a first lower limit value; and in a case where the rotational speed of the electric motor deviates from the first range, controlling the rotational speed of the electric motor so as to suppress deviation of the rotational speed of the electric motor from the first range; and in a case where the deviation of the rotational speed of the electric motor from the first range is continued for a predetermined time or more, setting a second range defined between a second upper limit value and a second lower limit value of the rotational speed of the electric motor which are respectively displaced from the first upper limit value and the first lower limit value in a direction in which the deviation of the rotational speed of the electric motor from the first range is continued.

5. The method as claimed in claim 4, wherein the second range defined by the second upper limit value and the second lower limit value of the rotational speed of the electric motor lies within a primary limit range set separately from the first range.

6. The method as claimed in claim 5, wherein when the electric oil pump is started, the rotational speed of the electric motor is controlled to lie within the primary limit range, and when the electric oil pump is in an operating condition, the rotational speed of the electric motor is controlled to lie within the first range.

\* \* \* \* \*